(12) United States Patent
Liang et al.

(10) Patent No.: US 6,871,957 B2
(45) Date of Patent: Mar. 29, 2005

(54) AUTOSTEREOSCOPIC DISPLAY FOR MULTIPLE VIEWERS

(75) Inventors: Rongguang Liang, Penfield, NY (US); Joshua M. Cobb, Victor, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/940,069

(22) Filed: Sep. 14, 2004

(65) Prior Publication Data

US 2005/0046798 A1 Mar. 3, 2005

Related U.S. Application Data

(62) Division of application No. 10/650,556, filed on Aug. 28, 2003.

(51) Int. Cl.[7] .................. G03B 21/00; G03B 21/26; G03B 21/28; G03B 27/22; G02F 1/1335
(52) U.S. Cl. .................... 353/7; 353/94; 353/98; 359/464; 349/15
(58) Field of Search .................. 353/7–10, 28, 353/34, 37, 98, 99, 122, 94; 359/462, 464, 479; 349/8, 11, 15

(56) References Cited

U.S. PATENT DOCUMENTS

| | | | |
|---|---|---|---|
| 5,189,452 A | * | 2/1993 | Hodson et al. ............... 353/94 |
| 5,311,360 A | | 5/1994 | Bloom et al. ............... 359/572 |
| 6,014,164 A | * | 1/2000 | Woodgate et al. ............ 348/51 |
| 6,307,663 B1 | | 10/2001 | Kowarz ...................... 359/231 |
| 6,416,181 B1 | | 7/2002 | Kessler et al. ................. 353/7 |
| 6,449,090 B1 | | 9/2002 | Omar et al. ................. 359/465 |
| 6,511,182 B1 | | 1/2003 | Agostinelli et al. ............ 353/7 |
| 6,755,532 B1 | | 6/2004 | Cobb ............................ 353/7 |

FOREIGN PATENT DOCUMENTS

EP   0 602 934 B1   10/1999

* cited by examiner

*Primary Examiner*—Judy Nguyen
*Assistant Examiner*—Anrew Sever
(74) *Attorney, Agent, or Firm*—Nelson Adrian Blish (57) ABSTRACT

An apparatus for displaying a stereoscopic virtual image to a first viewer (12a) and to a second viewer (12b), where the stereoscopic virtual image is imaged to each viewer at a left viewing pupil (14l) and a right viewing pupil (14r). Configurations using multiple beamsplitters (16) and one or two curved mirrors (24) direct the optical path to first and second viewers (12a and 12b).

2 Claims, 11 Drawing Sheets

AUTOSTEREOSCOPIC DISPLAY FOR MULTIPLE VIEWERS

CROSS REFERENCE TO RELATED APPLICATIONS

This is a divisional of application Ser. No. 10/650,556, filed Aug. 28, 2003.

FIELD OF THE INVENTION

This invention generally relates to display apparatus and more particularly relates to an apparatus and method for autostereoscopic display to multiple viewers.

BACKGROUND OF THE INVENTION

The potential value of autostereoscopic display systems is widely appreciated particularly in entertainment and simulation fields. Autostereoscopic display systems include "immersion" systems, intended to provide a realistic viewing experience for an observer by visually surrounding the observer with a three-dimensional (3-D) image having a very wide field of view. As differentiated from the larger group of stereoscopic displays that include it, the autostereoscopic display is characterized by the absence of any requirement for a wearable item of any type, such as goggles, headgear, or special glasses, for example. That is, an autostereoscopic display attempts to provide "natural" viewing conditions for an observer.

Figure 1:
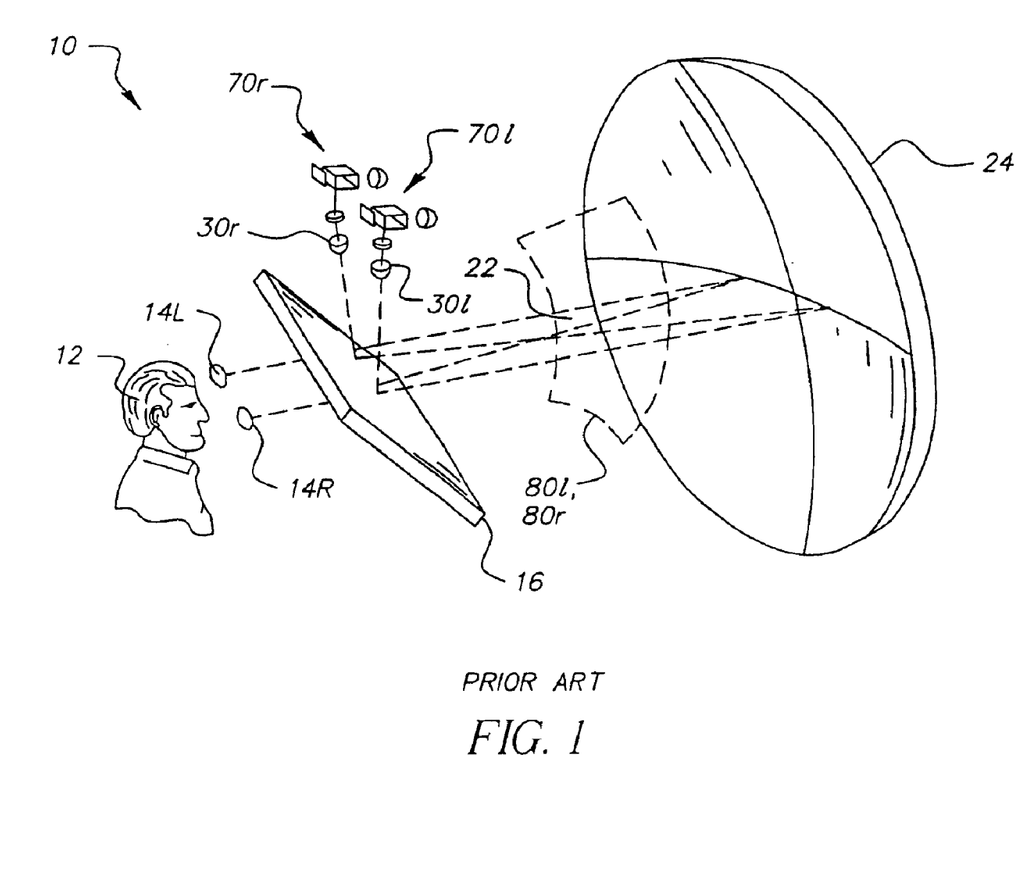
FIG. 1 is a perspective view showing a prior art autostereoscopic optical apparatus for display to a single viewer.

One example autostereoscopic system is disclosed in commonly-assigned U.S. Pat. No. 6,416,181 (Kessler et al.), incorporated herein by reference, herein referred to as the '181 patent. In an autostereoscopic projection apparatus 10 as described in the '181 disclosure and as shown in FIG. 1, a curved mirror 24 is employed, in combination with a beamsplitter 16 for providing an autostereoscopic virtual image to a viewer 12 at left and right viewing pupils 14*l* and 14*r*. For left and right viewing pupil 14*l* and 14*r*, a corresponding image generation system 70*l* and 70*r* provides an initial intermediate curved image that is then projected through a ball lens segment 30 in order to form a left or right intermediate curved image 80*l* or 80*r* at a focal plane of curved mirror 24.

The substantially monocentric optical apparatus of the '181 disclosure provides realistic autostereoscopic imaging with large viewing pupils, a very wide field of view, and minimal aberration. However, one salient limitation of the apparatus represented in FIG. 1 is its constraint to use by only one viewer 12 at a time. While this arrangement may be suitable for some types of simulator or entertainment applications, there can be applications where it is advantageous, and more cost-effective, to provide autostereoscopic images to a second viewer 12.

Aultostereoscopic display systems for multiple viewers have been proposed, including the following:

U.S. Pat. No. 6,449,090 (Omar et al.) discloses a dual-function apparatus that can be used to provide an autostereoscopic image to a single viewer and stereoscopic images to multiple viewers, each of whom, however, requires a polarizing or shuttering device; and European Patent Specification EP 0 602 934 discloses an autostereoscopic display apparatus that provides a real image simultaneously to two observers. One shortcoming of this approach for many types of display applications relates to the separation of left- and right-eye images; in a disclosed embodiment, right- and left-eye images are reversed for the two observers.

For fully satisfactory 3-D viewing, an autostereoscopic display system should provide separate, high-resolution images to right and left eyes. It can also be readily appreciated that such a system is most favorably designed for compactness, creating an illusion of depth and width of field, while occupying as little actual floor space and volume as is possible. For the most realistic viewing experience, the observer should be presented with a virtual image, disposed to appear a large distance away. Thus, it can be seen that there is a need for an autostereoscopic imaging subsystem using pupil imaging that provides virtual images for multiple viewers.

SUMMARY OF THE INVENTION

It is an object of the present invention to provide an autostereoscopic display apparatus that can be viewed by multiple viewers. With this object in mind, the present invention provides an autostereoscopic optical apparatus for displaying a stereoscopic virtual image to a first viewer and to a second viewer, wherein the stereoscopic virtual image is imaged to each viewer at a left viewing pupil and a right viewing pupil, the apparatus comprising:

(a) a left image generation system for forming a curved left intermediate image;

(b) a left projection system comprising a left ball lens segment, wherein the pupil of the left ball lens segment is substantially concentric with the curved left intermediate image, the left ball lens segment forming a real image of the curved left intermediate image;

(c) a first beamsplitter disposed to direct the curved left intermediate image toward a focal surface of a first curved mirror, the first curved mirror forming a virtual image of the curved left intermediate image thereby, and the first curved mirror disposed to form:

(i) through the first beamsplitter, a real image of the pupil of the left ball lens segment at the left viewing pupil of the first viewer; and (ii) through a second beamsplitter, a real image of the pupil of the left ball lens segment at the left viewing pupil of the second viewer;

(d) a right image generation system for forming a curved right intermediate image;

(e) a right projection system comprising a right ball lens segment, wherein the pupil of the right ball lens segment is substantially concentric with the curved right intermediate image, the right ball lens segment forming a real image of the curved right intermediate image;

(f) a third beamsplitter disposed to direct the curved right intermediate image toward a focal surface of a second curved mirror, the second curved mirror forming a virtual image of the curved right intermediate image thereby, and the second curved mirror disposed to form:

(i) through the third beamsplitter, a real image of the pupil of the right ball lens segment at the right viewing pupil of the second viewer; and (ii) through the second beamsplitter, a real image of the pupil of the right ball lens segment at the right viewing pupil of the first viewer.

It is a feature of the present invention that it utilizes light that is otherwise unused for a single-viewer autostereoscopic immersion system. The system is essentially monocentric, inherently minimizing image aberrations.

It is an advantage of the present invention that it provides, from a single display apparatus full autostereoscopic viewing for at least two viewers.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 2b is a perspective view showing an arrangement of optical components corresponding to the schematic view of FIG. 2a;

FIG. 3b is a perspective view showing an arrangement of optical components corresponding to the schematic view of FIG. 3a;

FIG. 4b is a perspective view showing an arrangement of optical components corresponding to the schematic view of FIG. 4a;

FIG. 5b is a perspective view showing an arrangement of optical components corresponding to the schematic view of FIG. 5a;

FIG. 6b is a perspective view showing an arrangement of optical components corresponding to the schematic view of FIG. 6a.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

The disclosure of U.S. Pat. Nos. 6,416,181 and 6,755,532 (Cobb) and U.S. patent application Ser. No. 10/465,503 give detailed information on how an intermediate image can be formed using a linear or an area spatial light modulator. The description of the present invention that follows concerns itself with the optical path that, given these left and right intermediate images, forms left and right virtual images in order to provide an apparatus allowing multiple viewers. Embodiments with Multiple Curved Mirrors 24

Figure 2A:
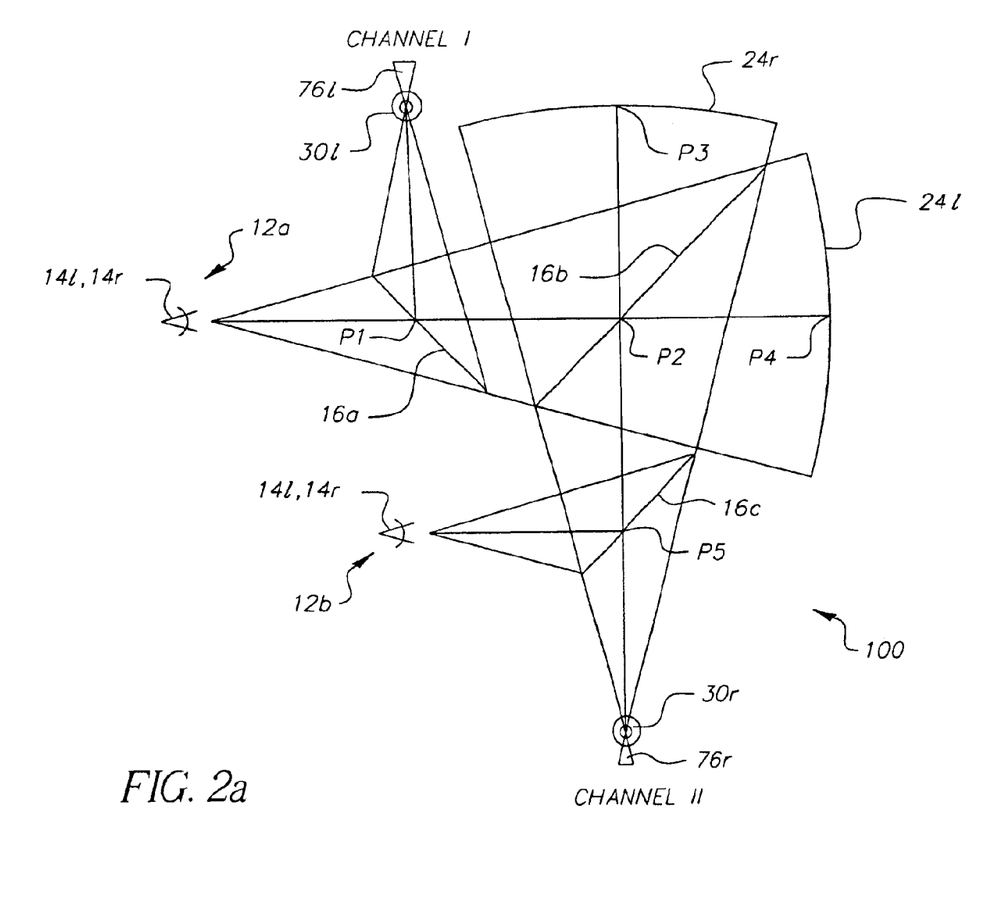
FIG. 2a is schematic view showing the optical paths for a display apparatus serving multiple viewers simultaneously.

Referring to FIG. 2a, there is shown, in side-view schematic form, an embodiment of a multi-viewer autostereoscopic imaging apparatus 100 employing a left curved mirror 24l for providing an image to left pupils 14l of viewers 12a and 12b. In the optical path for both left pupils 14l, a left intermediate image 76l is generated from left image generation system 70l, as shown in FIG. 1 and described in the '181 disclosure. Left ball lens segment 30l may be a ball lens component comprising a fully spherical lens or may be an hemispheric lens segment having a reflective surface, as is disclosed in commonly-assigned U.S. Pat. No. 6,511,182 (Agostinelli et al.), incorporated herein by reference. Left intermediate image 76l is projected by left ball lens segment 30l and reflected from a beamsplitter 16a to the focal surface of left curved mirror 24l as a real image. The resulting collimated left virtual image is then viewed by viewer 12a at left viewing pupil 14l. A second beamsplitter 16b cooperates with a third beamsplitter 16c to direct the collimated left virtual image to left viewing pupil 14l of viewer 12b.

Figure 2B:
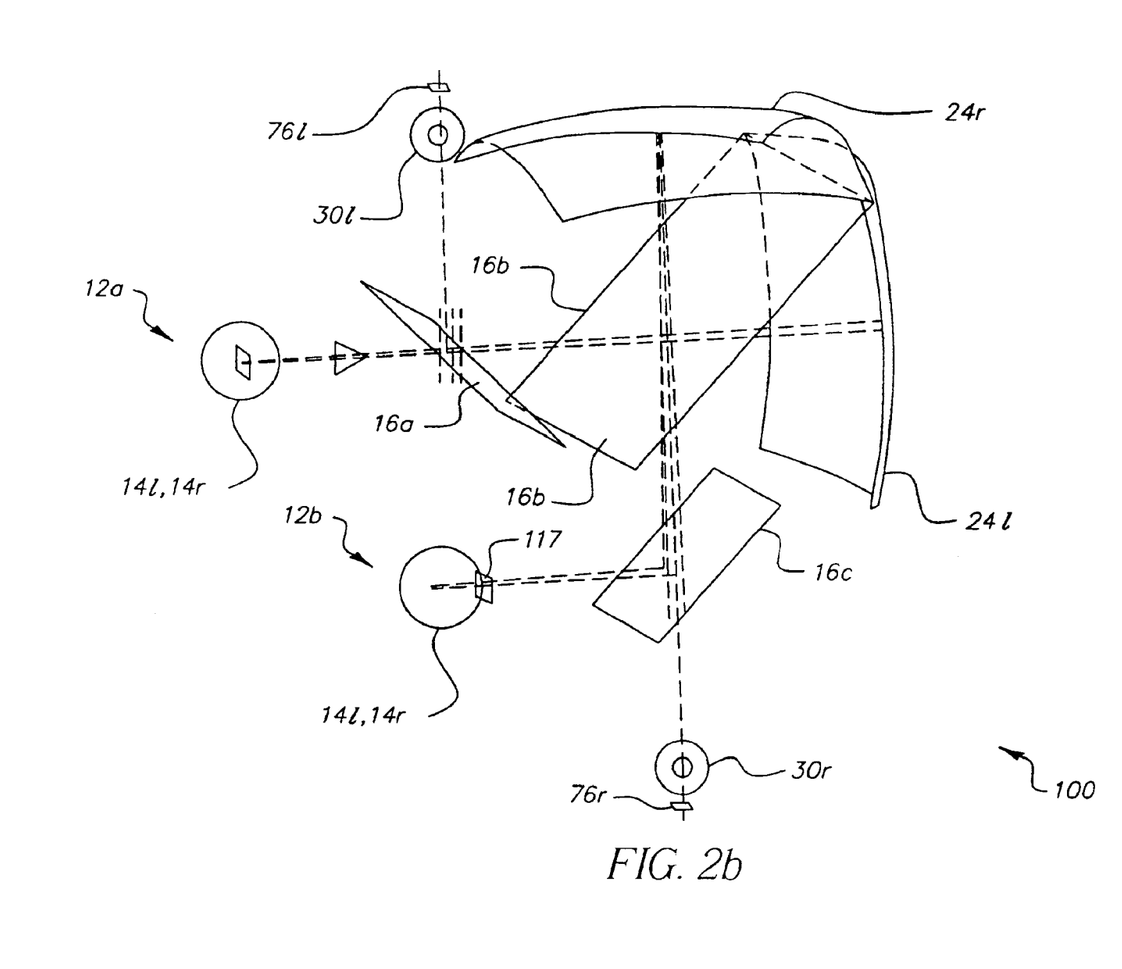

From the schematic view of FIG. 2a, the optical path to left viewing pupil 14l for viewer 12a can be traced through the following points:

Channel I→P1→P2→P4→P2→P1→Left viewing pupil 14l The optical path to left viewing pupil 14l for viewer 12b can be traced through the following points:

Channel I→P1→P2→P4→P2→P5→Left viewing pupil 14l The optical path for both right pupils 14r of viewers 12a and 12b begins with right intermediate image 76r, employs a curved mirror 24r and beamsplitters 16a, 16b, and 16c, and can be similarly traced. From the schematic view of FIG. 2a, the optical path to right viewing pupil 14r for viewer 12a can be traced through the following points:

Channel II→P5→P2→P3→P2→P1→Right viewing pupil 14r The optical path to right viewing pupil 14r for viewer 12b can be traced through the following points:

Channel II→P5→P2→P3→P2→P5→Right viewing pupil 14r Referring to FIG. 2b, there is shown a perspective view of optical components corresponding to the arrangement of FIG. 2a.

Figure 5A:
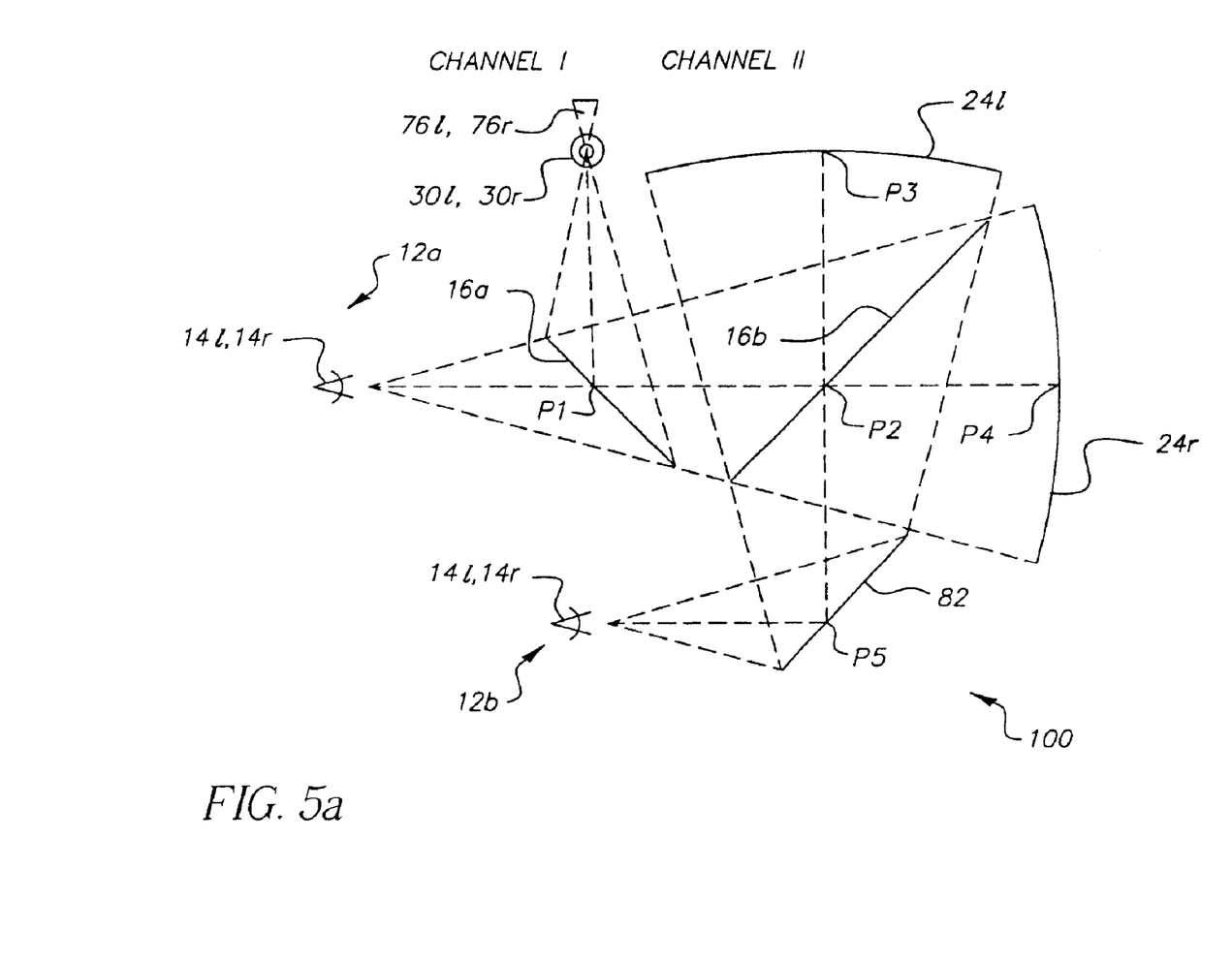
FIG. 5a is schematic view showing the optical paths for yet another alternative display apparatus serving multiple viewers simultaneously.
Figure 5B:
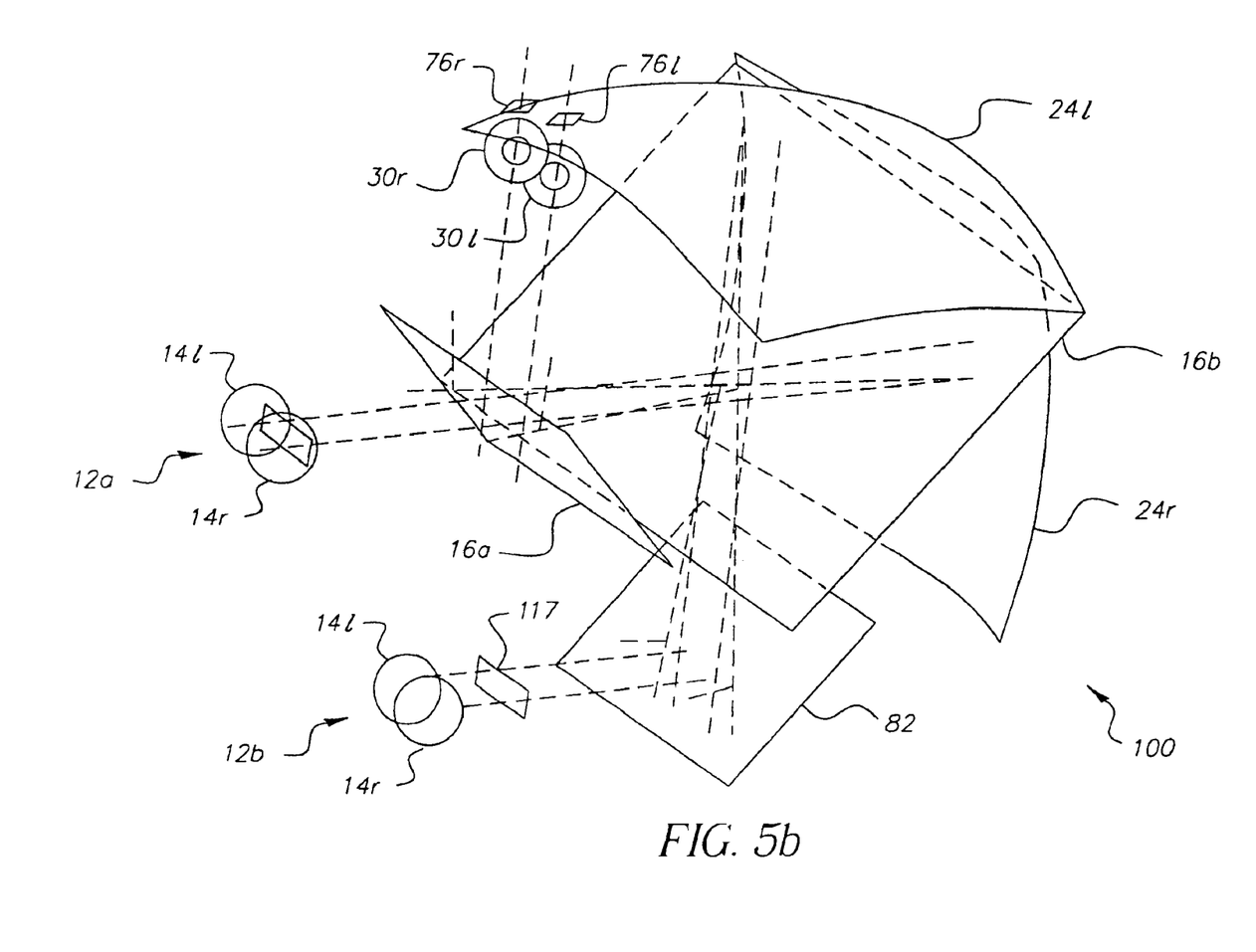

A second embodiment using multiple curved mirrors 24l and 24r is shown in FIGS. 5a and 5b. In this alternate arrangement, ball lens segments 30l and 30r are located close together, as is shown most clearly in the perspective view of FIG. 5b. Only two beamsplitters 16a and 16b are required. A folding mirror 82 is used for directing the light path to viewer 12b.

From the schematic view of FIG. 5a, the optical path to left viewing pupil 14l for viewer 12a can be traced through the following points:

Channel I→P1→P2→P3→P2→P1→Left viewing pupil 14l The optical path to left viewing pupil 14l for viewer 12b can be traced through the following points:

Channel I→P1→P2→P3→P2→P5→Left viewing pupil 14l

From the schematic view of FIG. 5a, the optical path to right viewing pupil 14r for viewer 12a can be traced through the following points:

Channel II→P1→P2→P4→P2→P1→Right viewing pupil 14r The optical path to right viewing pupil 14r for viewer 12b can be traced through the following points:

Channel III→P1→P2→P4→P2→P5→Right viewing pupil 14r

Embodiments with a Single Curved Mirror 24

Figure 3A:
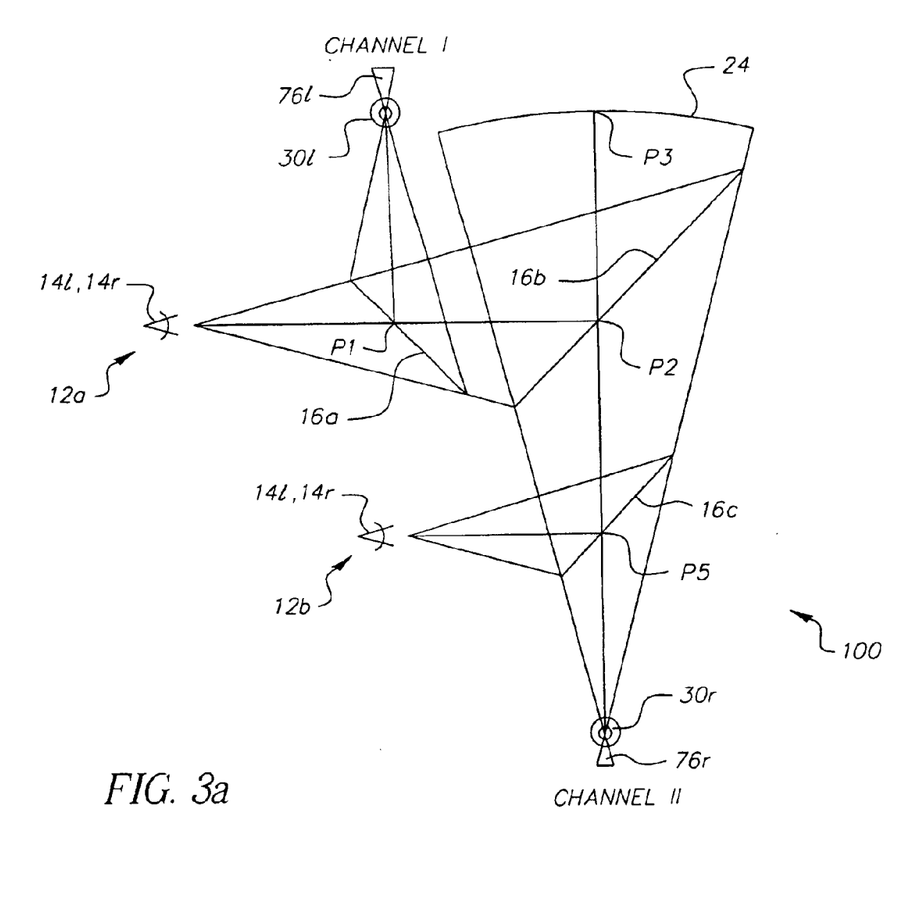
FIG. 3a is schematic view showing the optical paths for another embodiment of a display apparatus serving multiple viewers simultaneously, using a single mirror.

Referring to FIG. 3a, there is shown, in side-view schematic form, an embodiment of a multi-viewer autostereoscopic imaging apparatus 100 employing a single curved mirror 24 for providing images at both left and right pupils 14l and 14r for viewers 12a and 12b. In the optical path for both left pupils 14*l*, a left intermediate image 76*l* is generated from left image generation system 70*l* (not shown in FIG. 3*a*). Left intermediate image 76*l* is projected by left ball lens segment 30*l* and reflected from first beamsplitter 16*a* to second beamsplitter 16*b* near the focal surface of left curved mirror 24*l*, as a real image. The resulting collimated left virtual image is then reflected from second beamsplitter 16*b* and, through first beamsplitter 16*a* can be viewed by viewer 12*a* at left viewing pupil 14*l*. Second beamsplitter 16*b* also cooperates with third beamsplitter 16*c* to direct the collimated left virtual image to left viewing pupil 14*l* of viewer 12*b*.

From the schematic view of FIG. 3*a*, the optical path to left viewing pupil 14*l* for viewer 12*a* can be traced through the following points:

Channel I→P1→P2→P3→P2→P1→Left viewing pupil 14*l* The optical path to left viewing pupil 14*l* for viewer 12*b* can be traced through the following points:

Channel I→P1→P2→P3→P2→P5→Left viewing pupil 14*l*

From the schematic view of FIG. 3*a*, the optical path to right viewing pupil 14*r* for viewer 12*a* can be traced through the following points:

Channel II→P5→P2→P3→P2→P1→Right viewing pupil 14*r* The optical path to right viewing pupil 14*r* for viewer 12*b* can be traced through the following points:

Channel II→P5→P2→P3→P2→P5→Right viewing pupil 14*r*

Figure 3B:
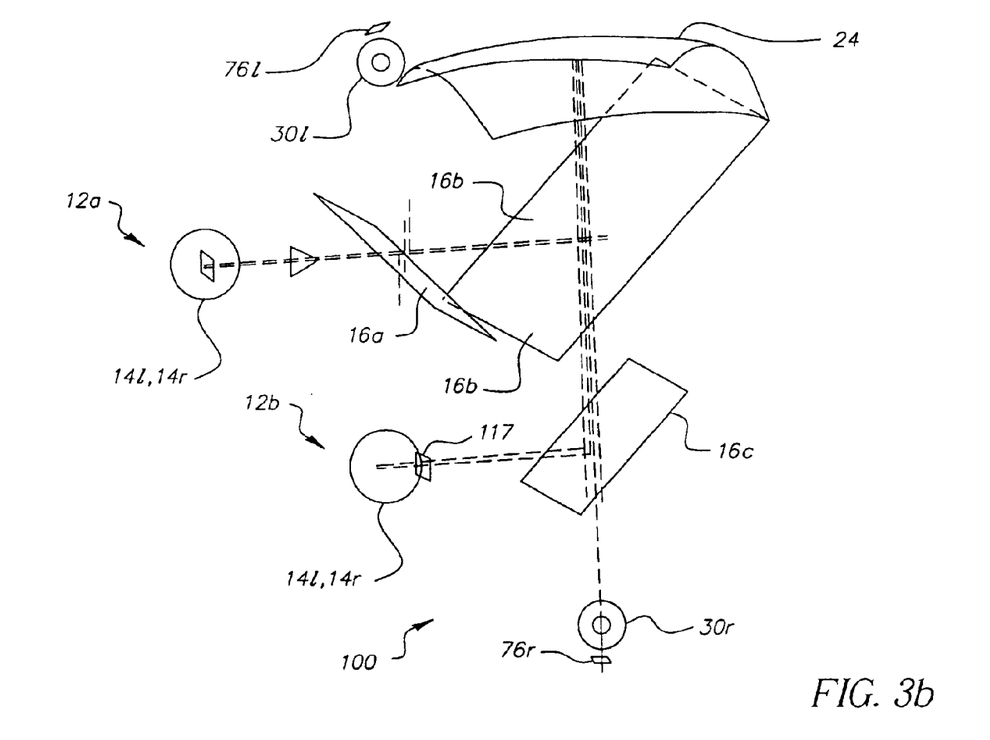

Referring to FIG. 3*b*, there is shown a perspective view of optical components corresponding to the arrangement of FIG. 3*a*.

Figure 4A:
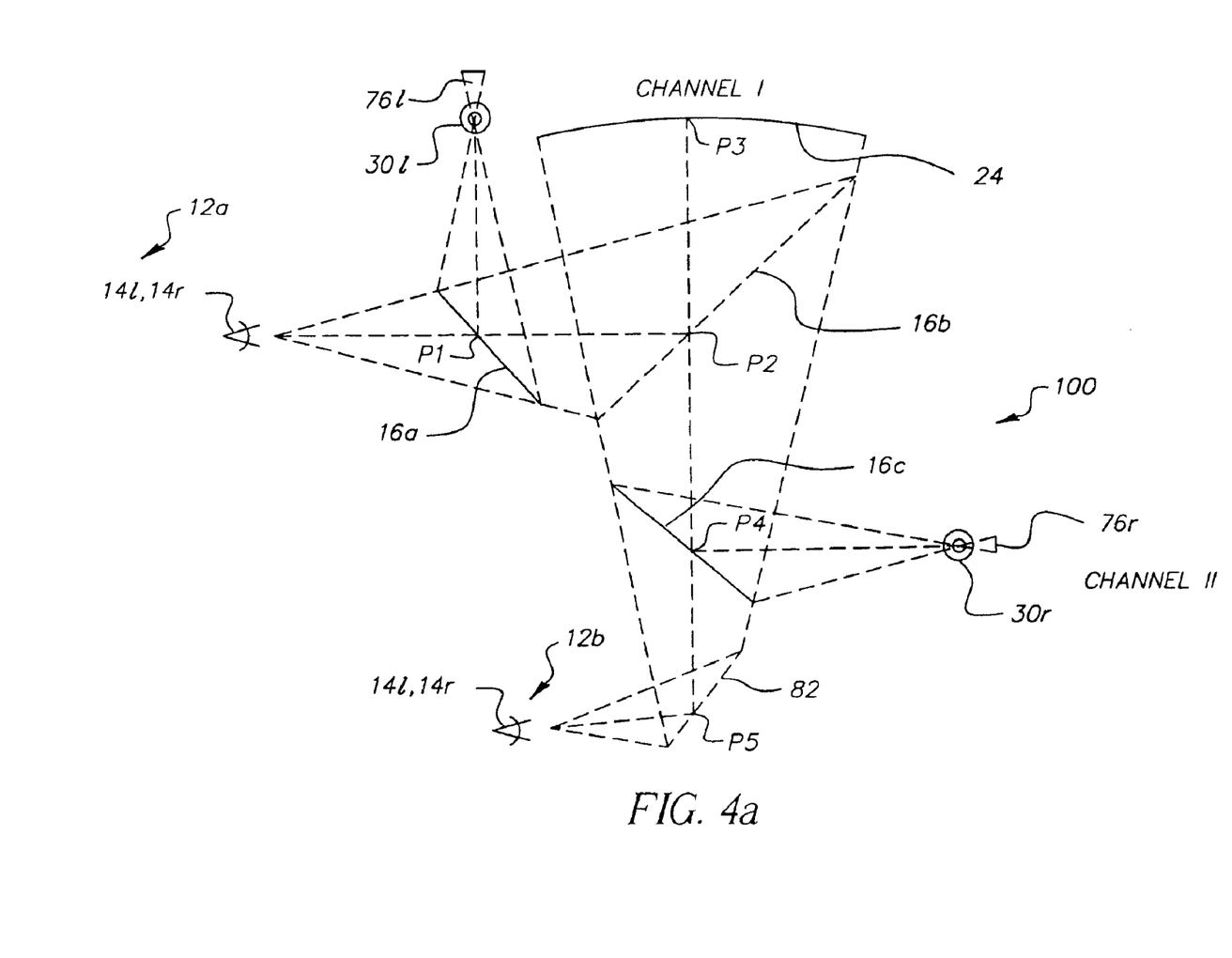
FIG. 4a is schematic view showing the optical paths for yet another single-curved-mirror embodiment of a display apparatus for a display apparatus serving multiple viewers simultaneously.
Figure 4B:
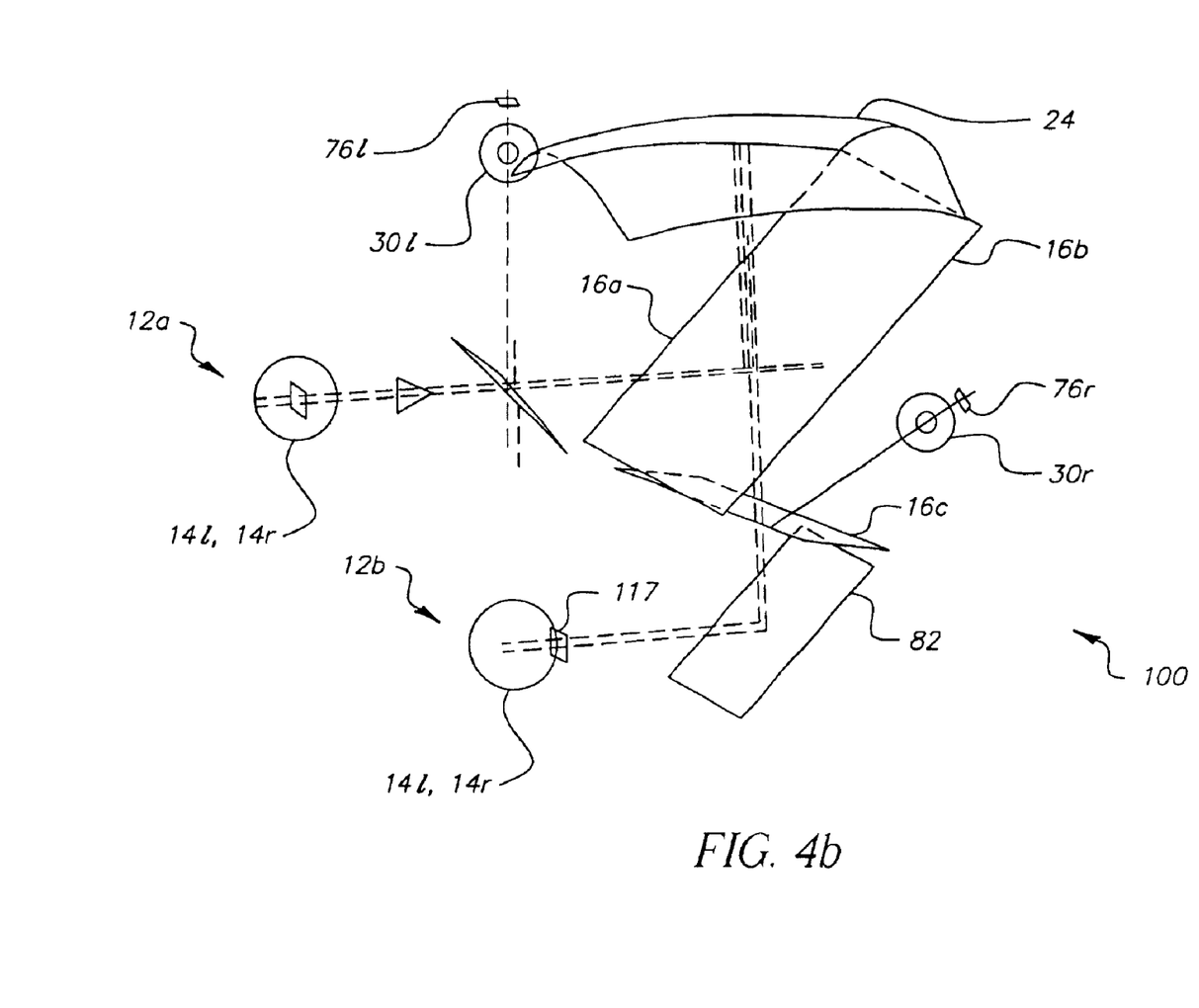

Referring to FIGS. 4*a* and 4*b*, there is shown an alternate arrangement for multi-viewer autostereoscopic imaging apparatus 100 using one curved mirror 24, with folding mirror 82 added. From the schematic view of FIG. 4*a*, the optical path to left viewing pupil 14*l* for viewer 12*a* can be traced through the following points:

Channel I→P1→P2→P3→P2→P1→Left viewing pupil 14*l*

The optical path to left viewing pupil 14*l* for viewer 12*b* can be traced through the following points:

Channel I→P1→P2→P3→P2→P4→P5→Left viewing pupil 14*l*

Figure 6A:
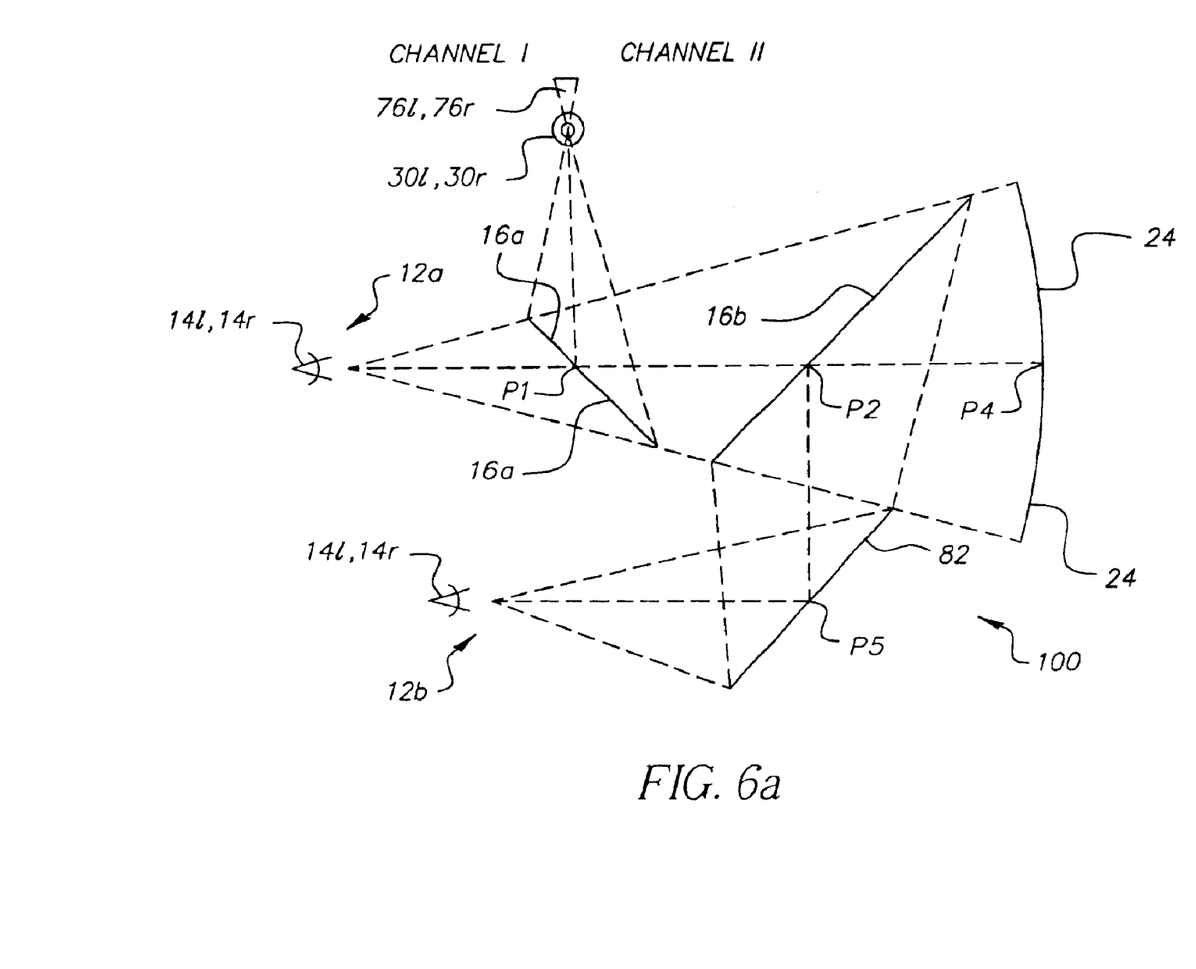
FIG. 6a is schematic view showing the optical paths for yet another alternative display apparatus using a single curved mirror to serve multiple viewers simultaneously.
Figure 6B:
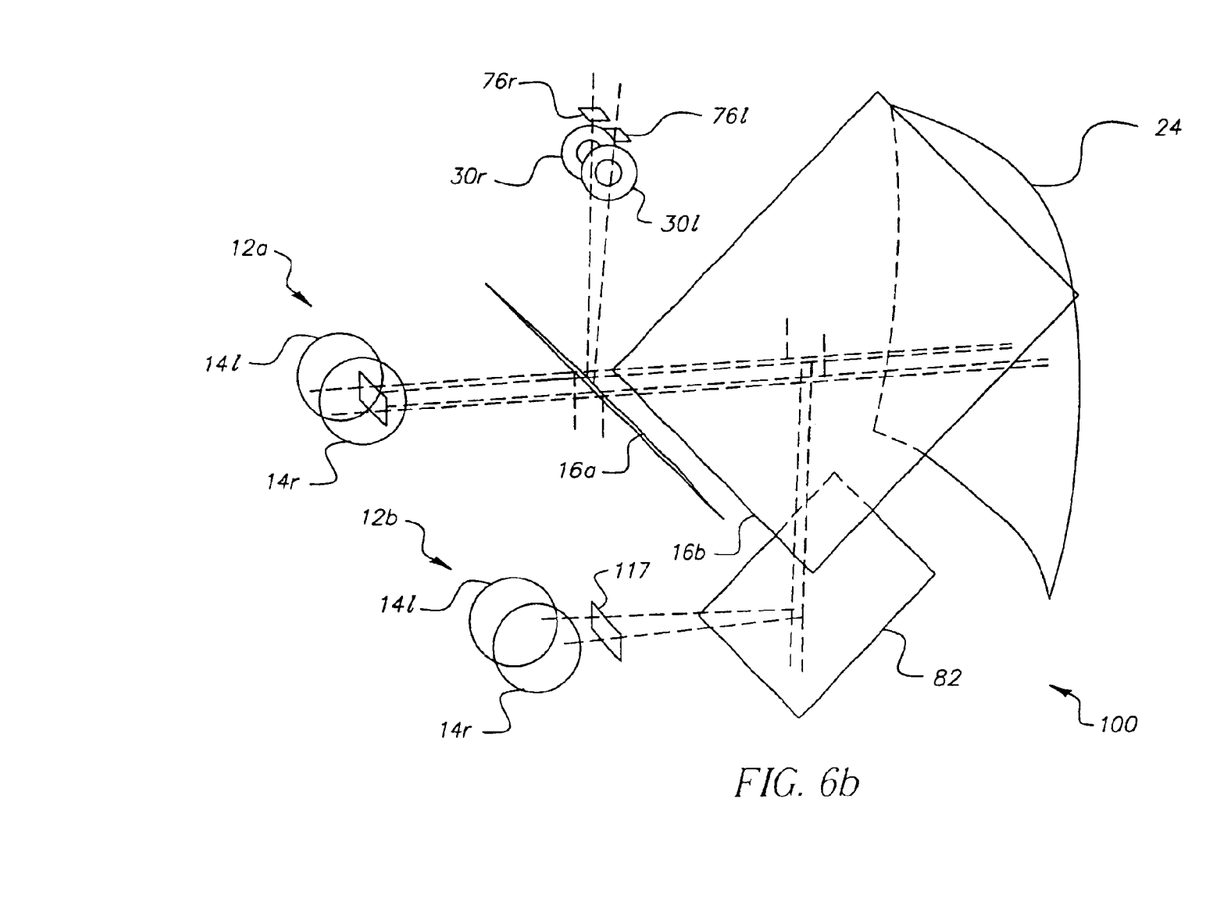

From the schematic view of FIG. 4*a*, the optical path to right viewing pupil 14*r* for viewer 12*a* can be traced through the following points:

Channel II→P4→P2→P3→P2→P1→Right viewing pupil 14*r* The optical path to right viewing pupil 14*r* for viewer 12*b* can be traced through the following points:

Channel II→P4→P2→P3→P2→P4→P5→Right viewing pupil 14*r* Yet another embodiment using one curved mirror 24 is shown in FIGS. 6*a* and 6*b*. In this alternate arrangement, ball lens segments 30*l* and 30*r* are located close together, as is shown most clearly in the perspective view of FIG. 6*b*. Only two beamsplitters 16*a* and 16*b* are required. Folding mirror 82 is used for directing the imaging light path to viewer 12*b*.

From the schematic view of FIG. 6*a*, the optical path to left viewing pupil 14*l* for viewer 12*a* can be traced through the following points:

Channel I→P1→P2→P4→P2→P1→Left viewing pupil 14*l* The optical path to left viewing pupil 14*l* for viewer 12*b* can be traced through the following points:

Channel I→P1→P2→P3→P2→P5→Left viewing pupil 14*l*

From the schematic view of FIG. 6*a*, the optical path to right viewing pupil 14*r* for viewer 12*a* can be traced through the following points:

Channel II→P1→P2→P4→P2→P1→Right viewing pupil 14*r* The optical path to right viewing pupil 14*r* for viewer 12*b* can be traced through the following points:

Channel I→P1→P2→P4→P2→P5→Right viewing pupil 14*r*

As is noted hereinabove, embodiments shown in FIGS. 2*b*, 3*b*, 4*b*, 5*b*, and 6*b* depict ball lens segments 30*l*, 30*r* as spherical; however, with any of these configurations, one or both ball lens segments 30*l*, 30*r* could use a hemispheric lens segment having a reflective surface.

Advantages and Tradeoffs for Embodiments Shown

The embodiments shown in FIGS. 2*b*, 3*b*, 4*b*, 5*b*, and 6*b* use different arrangements of curved mirror 24 and left and right ball lens segment 30*l* and 30*r*. It is instructive to note some advantages and drawbacks presented by the various design approaches shown in these figures. As advantages, designs using a single curved mirror 24, as shown in FIGS. 3*a*, 3*b*, 4*a*, 4*b*, 6*a*, and 6*b*, use fewer components and allow a longer working distance. Among disadvantages where using a single curved mirror 24 are off-axis anomalies for forming left and right viewing pupils 14*l* and 14*r*. For each viewer 12, both left and right optical paths must be slightly off-axis with respect to curved mirror 24. This causes a slight keystoning aberration in each optical path, with keystoning in opposite directions between left and right images. To some extent, this effect can be corrected electronically.

Designs using left and right curved mirrors 24*l* and 24*r*, such as those shown in FIGS. 2*a*, 2*b*, 5*a*, and 5*b* allow on-axis imaging, minimizing or eliminating keystoning effects. However, designs using multiple mirrors are disadvantaged due to mechanical placement constraints; it is difficult to arrange both left and right curved mirrors 24*l* and 24*r* without some obstruction and consequent reduction of field width.

Another design consideration relates to the relative positioning of left and right ball lens segments 30*l* and 30*r*. In the embodiments of FIGS. 2*b*, 3*b*, and 4*b*, both left and right ball lens segments 30*l* and 30*r* can be separately positioned, with a relatively large distance between them. This arrangement eases space requirements for imaging support components and allows the size of ball lens segment 30 components to be relatively larger, providing a larger viewing pupil 14. By contrast, the embodiments of FIGS. 5*b* and 6*b* require that ball lens segments 30*l* and 30*r* be positioned closely together, but allow a more compact design overall.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, a number of different image generation system 70 configurations could be employed, using either scanned linear spatial light modulators or area spatial light modulators. Examples of scanned linear spatial light modulators include grating light valve (GLV) linear arrays, as described in U.S. Pat. No. 5,311,360 (Bloom et al.) and conformal grating electromechanical system (GEMS) components, as disclosed in commonly-assigned U.S. Pat. No. 6,307,663 (Kowarz). Examples of area spatial light modulators include liquid crystal device (LCD) or digital micromirror device (DMD) components, both well known in the digital imaging arts.

The curved image formed as left or right intermediate image 76*l*, 76*r* could be formed on a diffusive surface, as was described in the '181 disclosure, or could be formed using techniques disclosed in U.S. Pat. No. 6,755,532 and U.S. patent application Ser. No. 10/465,503.

Thus, what is provided is an autostereoscopic display apparatus and method for providing a virtual image display using pupil imaging to multiple viewers.

PARTS LIST

10 Autostereoscopic imaging apparatus
12 Viewer
12a Viewer
12b Viewer
14 Viewing pupil
14l Viewing pupil, left
14r Viewing pupil, right
16 Beamsplitter
16a Beamsplitter
16b Beamsplitter
16c Beamsplitter
24 Curved mirror
24l Left curved mirror
24r Right curved mirror
30 Ball lens segment
30l Left ball lens segment
30r Right ball lens segment
70 Image generation system
70l Left image generation system
70r Right image generation system
76l Left intermediate image
76r Right intermediate image
80 Intermediate curved image
80l Intermediate curved image, left
80r Intermediate curved image, right
82 Folding mirror
100 Multi-viewer autostereoscopic imaging apparatus

What is claimed is:

1. An autostereoscopic optical apparatus for displaying a stereoscopic virtual image to a first viewer and to a second viewer, wherein the stereoscopic virtual image is imaged to each viewer at a left viewing pupil and a right viewing pupil, the apparatus comprising:

(a) a left image generation system for forming a curved left intermediate image;

(b) a left projection system comprising a left ball lens segment, wherein the pupil of said left ball lens segment is substantially concentric with said curved left intermediate image, said left ball lens segment forming a real image of said curved left intermediate image;

(c) a first beamsplitter disposed to direct said curved left intermediate image through a second beamsplitter and toward a focal surface of a curved mirror, said first curved mirror forming a virtual image of said curved left intermediate image thereby, and said curved mirror disposed to form:

(i) through said first and second beamsplitters, a real image of the pupil of said left ball lens segment at the left viewing pupil of the first viewer; and (ii) through said second beamsplitter, a real image of the pupil of said left ball lens segment at the left viewing pupil of the second viewer;

(d) a right image generation system for forming a curved right intermediate image;

(e) a right projection system comprising a right ball lens segment, wherein the pupil of said right ball lens segment is substantially concentric with said curved right intermediate image, said right ball lens segment forming a real image of said curved right intermediate image;

(f) said first beamsplitter disposed to direct said curved right intermediate image toward the focal surface of said second curved mirror, said curved mirror forming a virtual image of said curved right intermediate image thereby, and said curved mirror disposed to form:

(i) through said second beamsplitter, a real image of the pupil of said right ball lens segment at the right viewing pupil of the second viewer; and (ii) through said second beamsplitter and said first beamsplitter, a real image of the pupil of said right ball lens segment at the right viewing pupil of the first viewer.

2. A method for displaying an autostereoscopic virtual image to a first viewer and to a second viewer, wherein the autostereoscopic virtual image is imaged to each viewer at a left viewing pupil and a right viewing pupil, the method comprising:

(a) forming a curved left intermediate image;

(b) projecting a real image of said curved left intermediate image through a left ball lens segment toward a focal surface of a first curved mirror, said first curved mirror forming a virtual image of said curved left intermediate image and said first curved mirror disposed to form:

(i) through a first and a second beamsplitter, a real image of the pupil of said left ball lens segment at the left viewing pupil of the first viewer; and (ii) through said second beamsplitter, a real image of the pupil of said left ball lens segment at the left viewing pupil of the second viewer;

(c) forming a curved right intermediate image;

(d) projecting a real image of said curved right intermediate image through a right ball lens segment toward a focal surface of a second curved mirror, said second curved mirror forming a virtual image of said curved right intermediate image and said second curved mirror disposed to form:

(i) through said first and second beamsplitters, a real image of the pupil of said right ball lens segment at the right viewing pupil of the first viewer; and (ii) through said second beamsplitter, a real image of the pupil of said right ball lens segment at the right viewing pupil of the second viewer.

* * * * *